(12) United States Patent
Jarvenpaa

(10) Patent No.: US 11,054,652 B2
(45) Date of Patent: Jul. 6, 2021

(54) AUGMENTED REALITY APPARATUS

(71) Applicant: Nokia Technologies Oy, Espoo (FI)

(72) Inventor: Toni Jarvenpaa, Akaa (FI)

(73) Assignee: Nokia Technologies Oy, Espoo (FI)

( * ) Notice: Subject to any disclaimer, the term of this patent is extended or adjusted under 35 U.S.C. 154(b) by 197 days.

(21) Appl. No.: 16/337,967

(22) PCT Filed: Sep. 27, 2017

(86) PCT No.: PCT/FI2017/050681
§ 371 (c)(1),
(2) Date: Mar. 29, 2019

(87) PCT Pub. No.: WO2018/060557
PCT Pub. Date: Apr. 5, 2018

(65) Prior Publication Data
US 2020/0026081 A1    Jan. 23, 2020

(30) Foreign Application Priority Data

Sep. 30, 2016  (EP) ..................... 16191681

(51) Int. Cl.
*G02B 27/01* (2006.01)
*G02B 5/18* (2006.01)
*F21V 8/00* (2006.01)

(52) U.S. Cl.
CPC ....... *G02B 27/0172* (2013.01); *G02B 5/1828* (2013.01); *G02B 6/0011* (2013.01); *G02B 2027/0138* (2013.01); *G02B 2027/0178* (2013.01)

(58) Field of Classification Search
CPC .. G02B 27/0172; G02B 27/017; G02B 27/01; G02B 5/1828; G02B 5/18; G02B 6/0011; G02B 6/0001; G02B 2027/0138; G02B 2027/0178
USPC ......................................................... 359/630
See application file for complete search history.

(56) References Cited

U.S. PATENT DOCUMENTS

| | | | |
|---|---|---|---|
| 9,164,290 B2 * | 10/2015 | Robbins | G02B 27/0172 |
| 2001/0009478 A1 | 7/2001 | Yamazaki et al. | 359/630 |
| 2003/0020006 A1 * | 1/2003 | Janeczko | G02B 27/4211 250/216 |
| 2003/0086135 A1 * | 5/2003 | Takeyama | G02B 27/0081 359/13 |
| 2006/0152618 A1 * | 7/2006 | Yamasaki | H04N 5/232941 348/345 |
| 2010/0232016 A1 * | 9/2010 | Landa | G02B 6/005 359/466 |

(Continued)

FOREIGN PATENT DOCUMENTS

EP    2 133 727 A1    12/2009

*Primary Examiner* — William R Alexander
(74) *Attorney, Agent, or Firm* — Harringto & Smith

(57) ABSTRACT

According to various but not necessarily all embodiments of the invention, there is provided an apparatus including an optical engine configured to provide one or more light beams, a camera, a waveguide configured to guide the one or more light beams wherein the waveguide includes a diffractive in-coupling grating and at least one diffractive out-coupling, wherein the at least one out-coupling grating is configured to out-couple the one or more light beams towards an eye of a user and towards the camera.

15 Claims, 8 Drawing Sheets

(56) References Cited

U.S. PATENT DOCUMENTS

| | | | | |
|---|---|---|---|---|
| 2013/0016413 A1* | 1/2013 | Saeedi | ............... | G02B 27/0093 |
| | | | | 359/205.1 |
| 2013/0077049 A1* | 3/2013 | Bohn | .................. | G02B 27/017 |
| | | | | 351/210 |
| 2013/0176533 A1* | 7/2013 | Raffle | ................ | G06K 9/2036 |
| | | | | 351/209 |
| 2013/0235191 A1 | 9/2013 | Miao et al. | ................... | 348/143 |
| 2013/0314793 A1* | 11/2013 | Robbins | ............. | G02B 27/0172 |
| | | | | 359/573 |
| 2014/0211320 A1* | 7/2014 | Hori | .................... | G02B 27/017 |
| | | | | 359/630 |
| 2014/0293389 A1* | 10/2014 | Akutsu | ................... | G02B 5/32 |
| | | | | 359/15 |
| 2015/0125109 A1* | 5/2015 | Robbins | ................ | G02B 27/01 |
| | | | | 385/10 |
| 2016/0077338 A1* | 3/2016 | Robbins | ................ | G09G 3/002 |
| | | | | 345/8 |

\* cited by examiner

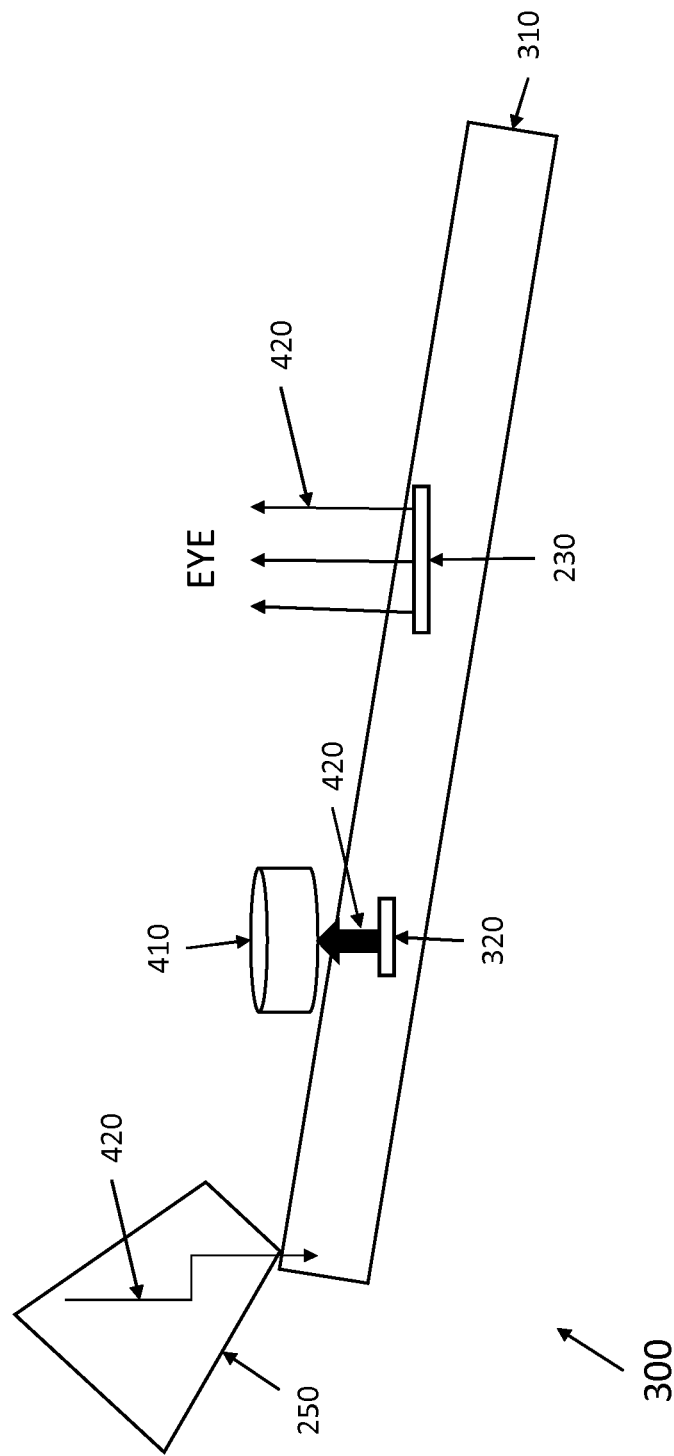

AUGMENTED REALITY APPARATUS

CROSS REFERENCE TO RELATED APPLICATION

This patent application is a U.S. National Stage application of International Patent Application Number PCT/FI2017/050681 filed Sep. 27, 2017, which is hereby incorporated by reference in its entirety, and claims priority to EP 16191681.2 filed Sep. 30, 2016.

TECHNICAL FIELD

Embodiments of the present invention relate to augmented reality and in particular to an optical apparatus capable of displaying augmented reality content.

BACKGROUND

An apparatus capable of presenting augmented reality content may provide a user with an enhanced user experience. The user may view augmented reality content by using various different apparatuses. Some of such apparatuses include optical features that allow the apparatus to have a form factor that resembles eye-glasses.

SUMMARY

Various aspects of examples of the invention are set out in the claims.

According to various but not necessarily all embodiments of the invention, there is provided an apparatus comprising means for guiding by a waveguide one or more light beams, provided by an optical engine, wherein the waveguide comprises a diffractive in-coupling grating, and at least one diffractive out-coupling grating, wherein the at least one out-coupling grating is configured to out-couple the one or more light beams towards an eye of a user and towards a camera.

According to various but not necessarily all embodiments of the invention, there is provided an apparatus comprising an optical engine configured to provide one or more light beams, a camera, a waveguide configured to guide the one or more light beams wherein the waveguide comprises a diffractive in-coupling grating and at least one diffractive out-coupling, wherein the at least one out-coupling grating is configured to out-couple the one or more light beams towards an eye of a user and towards the camera.

According to various but not necessarily all embodiments of the invention the apparatus further comprises a diffractive intermediate grating.

According to various but not necessarily all embodiments of the invention the diffractive out-coupling grating of the apparatus comprises a first diffractive out-coupling grating configured to out-couple the one or more light beams towards the eye of the user, and the diffractive intermediate grating is configured to out-couple the one or more light beams towards the camera.

According to various but not necessarily all embodiments of the invention the at least one diffractive out-coupling grating comprises a first diffractive out-coupling grating configured to out-couple the one or more light beams towards the eye of the user, and a second diffractive out-coupling grating configured to out-couple the one or more light beams towards the camera.

According to various but not necessarily all embodiments of the invention the apparatus further comprises a shutter located in front of the camera.

According to various but not necessarily all embodiments of the invention the apparatus comprises a movable polarizer located between the second diffractive out-coupling grating and the camera.

According to various but not necessarily all embodiments of the invention the camera is configured to detect the one or more out-coupled light beams and the environment.

According to various but not necessarily all embodiments of the invention the out-coupled one or more light beams and the environment detected by the camera are used to adjust the one or more light beams provided by the optical engine.

According to various but not necessarily all embodiments of the invention the apparatus further comprises a second waveguide, and a second camera.

According to various but not necessarily all embodiments of the invention the apparatus further comprises a second optical engine and wherein the optical engine and the second optical engine are located on separate sides of the apparatus.

According to various but not necessarily all embodiments of the invention the camera and the second camera are located on a left side and a right side of the apparatus, respectively and wherein the apparatus is further configured to perform left-right display adjustment for the camera and the second camera.

According to various but not necessarily all embodiments of the invention the optical engine is located on the side of the apparatus.

According to various but not necessarily all embodiments of the invention the optical engine is located in the middle of the apparatus.

According to various but not necessarily all embodiments of the invention there is provided a method for guiding by a waveguide one or more light beams, provided by an optical engine, wherein the waveguide comprises a diffractive in-coupling grating, and at least one diffractive out-coupling grating, wherein the at least one out-coupling grating is configured to out-couple the one or more light beams towards an eye of a user and towards a camera.

According to various but not necessarily all embodiments of the invention, there is provided a computer program product comprising computer program code stored in a non-transitory memory medium, the computer program code being configured to cause an apparatus, when executing the program code by a processor circuitry, to perform at least the following: guiding by a waveguide one or more light beams, provided by an optical engine, wherein the waveguide comprises a diffractive in-coupling grating, and at least one diffractive out-coupling grating, wherein the at least one out-coupling grating is configured to out-couple the one or more light beams towards an eye of a user and towards a camera.

The present disclosure includes one or more corresponding aspects, example embodiments or features in isolation or in various combinations whether or not specifically stated (including claimed) in that combination or in isolation. Corresponding means for performing one or more of the discussed functions are also within the present disclosure.

BRIEF DESCRIPTION OF THE DRAWINGS

FIG. 4 illustrates an example embodiment of a see-through display element and placement of a camera.

DETAILED DESCRIPTION

A user's perception of the surrounding physical environment may be enhanced by overlaying virtual images to the user's visual field of view and/or supplementing physical objects with virtual enhancements. This modified physical environment may be generated by an apparatus. This enhanced perception of the physical environment is known as augmented reality.

Augmented reality may be utilized in various fields. For example, gaming and navigation applications may be enhanced by augmented reality and in fields like assembly, maintenance and training it may provide visual guidance thus enhancing user experience. In the field or interior design for example, augmented reality may enable a user to virtually test how a piece of furniture would fit in a room. It is also possible to visualize building construction projects in the real physical environment by utilizing augmented reality.

Augmented reality may be perceived by using a head-worn apparatus. Such a head-worn apparatus may also be known as a Near-Eye Display apparatus, Head-Mounted Display apparatus or a Heads-Up Display apparatus. The head-worn apparatus may have a form factor such as eyeglasses, a harness or a helmet.

Figure 1:
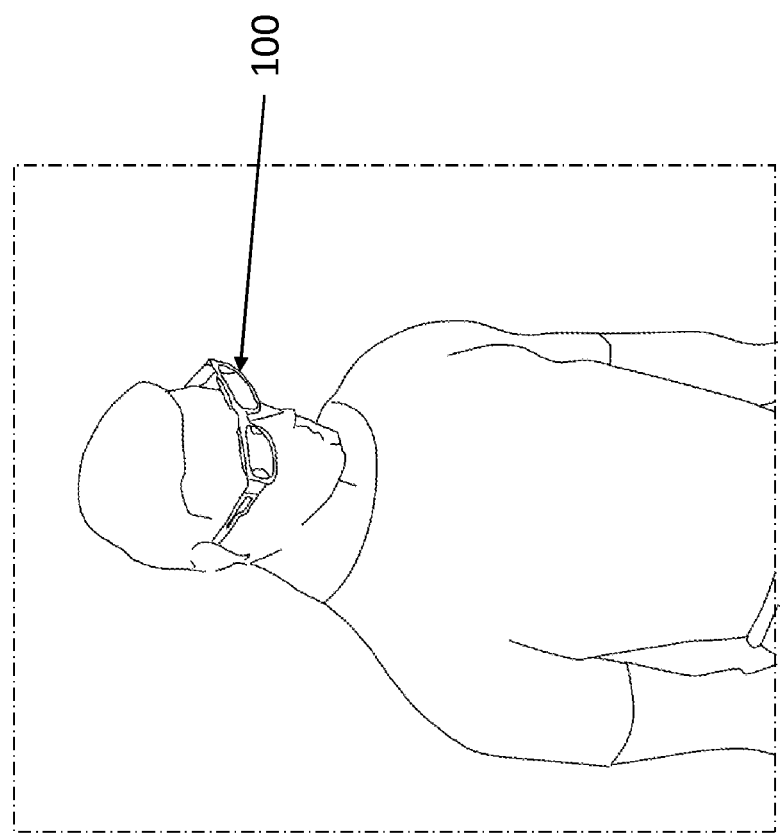
FIG. 1 illustrates an example embodiment of an augmented reality apparatus.

FIG. 1 illustrates an example embodiment of an apparatus 100 that is capable of presenting augmented reality content. The apparatus 100 is a head-worn apparatus that comprises at least one see-through display element oriented such that one part of the at least one see-through display element corresponds with one of the viewer's eyes and another part of the at least one see-through display element corresponds with the other one of the viewer's eyes. Although the form factor of the apparatus 100 in this example embodiment is similar to a pair of eyeglasses, the apparatus 100 could have an alternative type of a form factor. For example, the form factor may correspond to that of a monocular near eye display that comprises a single see-through display element.

The user may look through the at least one see-through display element of the apparatus 100 as can be seen in FIG. 1. This way, the user may perceive content that is displayed by the apparatus 100. For example, the at least one see-through display element may direct light beam into one of the viewer's retinas such that the viewer perceives one or more images projected by the apparatus 100. Alternatively, the apparatus 100 may project light through a collimating reflector towards one of the eye of the user such that the user perceives one or more images displayed on the see through display.

In some example embodiments, the apparatus 100 enables the user to perceive the one or more displayed virtual images as larger than the size of the images projected or displayed on the at least one see-through display element of the apparatus 100.

The apparatus 100 may comprise at least one processor circuitry and at least one memory. The at least one processor circuitry may be any type of processor and may further comprise any one or more of a controller, an embedded controller, processors core and/or the like. The processor circuitry utilizes computer program code to cause the apparatus 100 to perform one or more actions. The memory may comprise volatile memory, such as volatile Random Access Memory (RAM) including a cache area for the temporary storage of data and/or other memory, for example non-volatile memory, which may be embedded and/or the like. The non-volatile memory may comprise any one or more of EEPROM, a flash memory and the like. The memory may store any of number of pieces of information and data. The information and data may be used by the apparatus 100 to implement one or more functions of the apparatus 100 such as the functions described herein. In at least one example embodiment the memory includes computer program code such that the memory and the computer program code are configured to, working with the processor circuitry, cause the apparatus 100 to perform one or more actions described herein.

The apparatus 100 may further comprise a communication unit. The communication unit may comprise an antenna, or multiple antennae, a wired connector, and/or the like in operable communication with a transmitter and/or a receiver. In at least one example embodiment the processor circuitry may provide signals to a transmitter or may receive signals from a receiver, or both. The signals may comprise any one or more of signaling information in accordance with a communication interface standard, user speech, received data, user generated data and/or the like. The communication unit may operate with one or more air interface standards, communication protocols, modulation types and access types (e.g. one or more standards in the Institute of Electrical and Electronic Engineers (IEEE) 802 family of wired and wireless standards). By way of illustration, the communication unit may operate in accordance with second generation wireless communication protocols, with third-generation wireless communication protocols such as Universal Mobile Telecommunications System (UMTS), CDMA2000, wideband CDMA (WCDMA) and time division-synchronous CDMA (TD-CDMA) and/or with fourth-generation (4G) wireless communication protocols, wireless networking protocols, such as 802.11, short-range wireless protocols, such as Bluetooth, and/or the like. Communication device 15 may operate in accordance with wireline protocols, such as Ethernet, digital subscriber line (DSL), asynchronous transfer mode (ATM), and the like.

The processor circuitry may further comprise means, such as circuitry, for implementing audio, video, communication, navigation, logic functions, and/or the like, as well as for implementing one or more example embodiments including, for example, one or more of the functions described herein. For example, the processor circuitry may comprise means, such as a digital signal processor device, a microprocessor device, an analog to digital converter, a digital to analog converter and other circuits, for performing various functions including, for example, one or more of the functions described herein. The apparatus 100 may perform control and signal processor functions of the apparatus 100 among these devices according to their respective capabilities. The processor circuitry thus may comprise the functionality to encode and interleave message and data prior to modulation and transmission. The processor circuitry may additionally comprise an internal voice coder, and may comprise an internal data modem. Further, the processor circuitry may comprise functionality to operate one or more software programs, which may be stored in memory and which may, among other things, cause the processor circuitry to implement at least one or more of the functions described herein. For example, the processor circuitry may operate a connectivity program, such as a conventional internet browser. The connectivity program may allow the apparatus 100 to transmit and receive internet content, such as one or more of location-based content and other web page content, according to one or more of a Transmission Control Protocol (TCP), Internet Protocol (IP), User Datagram Protocol (UDP), Internet Message Access Protocol (IMAP), Post Office Protocol (POP), Simple Mail Transfer Protocol (SMTP), Wireless Application Protocol (WAP), Hypertext Transfer Protocol (HTTP), and the like, for example.

The apparatus 100 may further comprise a user interface for providing output or receiving input or both. The apparatus 100 may comprise an output device. The output device may comprise one or more of an audio output device, such as a ringer, an earphone, a speaker, and the like. The output device may comprise a tactile output device, such as a vibration transducer, an electronically deformable surface, an electronically deformable structure, and the like. The output device may comprise one or more visual output device, such as a display, a light, and/or the like. In at least one example embodiment, the apparatus causes display of information, the causation of display may comprise displaying the information on a display comprised by the apparatus, sending the information to a separate apparatus, and/or the like. For example, the apparatus may send the information to one or more a separate display, a computer, a laptop, a mobile apparatus, and the like. For example, the apparatus may be a server that causes display of the information by way of sending the information to a client apparatus that displays the information. In this manner, causation of display of the information may for example comprise sending to the separate display one or more messages that comprise the information, streaming the information to the separate apparatus, and/or the like. The apparatus 100 may comprise an input device. The input device may comprise one or more of any of a light sensor, a proximity sensor, a microphone, a touch sensor, a force sensor, a button, a keypad, a motion sensor, a magnetic field sensor, a camera, and the like. A touch sensor and a display may be characterized as a touch display. In an embodiment comprising a touch display, the touch display may be configured to receive input, for example from a single point of contact, multiple points of contact, and/or the like. In such an embodiment, the touch display or the processor, or both, may determine input based, at least in part, on any one or more position, motion, speed, contact area, and the like of the single point of contact or multiple points of contact received by the touch display. In at least one example embodiment, the apparatus receives an indication of an input. The apparatus may receive the indication from one or more of a sensor, a driver, a separate apparatus, and the like. The indication may comprise information that conveys, for example, one or more of information indicative of the input, information indicative of an aspect of the input, information indicative of an occurrence of the input, and the like.

The input device may comprise a media capturing element. The media capturing element may be any means for capturing an image, video, and/or audio for storage, display or transmission. For example, in at least one example embodiment in which the media capturing element is a camera module, the camera module may comprise a digital camera which may form a digital image file from a captured image. As such, the camera module may comprise hardware, such as a lens or other optical component(s), and software for creating a digital image file from a captured image. Alternatively, the camera module may comprise only the hardware for viewing an image, while a memory device of the apparatus 100 stores instructions for execution by the processor circuitry in the form of software for creating a digital image file from a captured image. In at least one example embodiment, the camera module may further comprise a processing element that is separate from the processor circuitry for processing data, such as image data. The camera module may provide data, such as image data, in one or more of various formats. In at least one example embodiment, the camera module comprises an encoder, a decoder, and/or the like for compressing and/or decompressing image data. The encoder and/or decoder may encode and/or decode according to a standard format, for example, a Joint Photographic Experts Group (JPEG) standard format.

Various technical solutions may exist for implementing an apparatus capable of presenting augmented reality content. In some example embodiments image information from a micro-display is enlarged by imaging optics located close to the eye(s) of a user thereby enabling the user to perceive one or more images. Diffractive optical elements on a waveguide may be used in such systems as the imaging optics.

Figure 2:
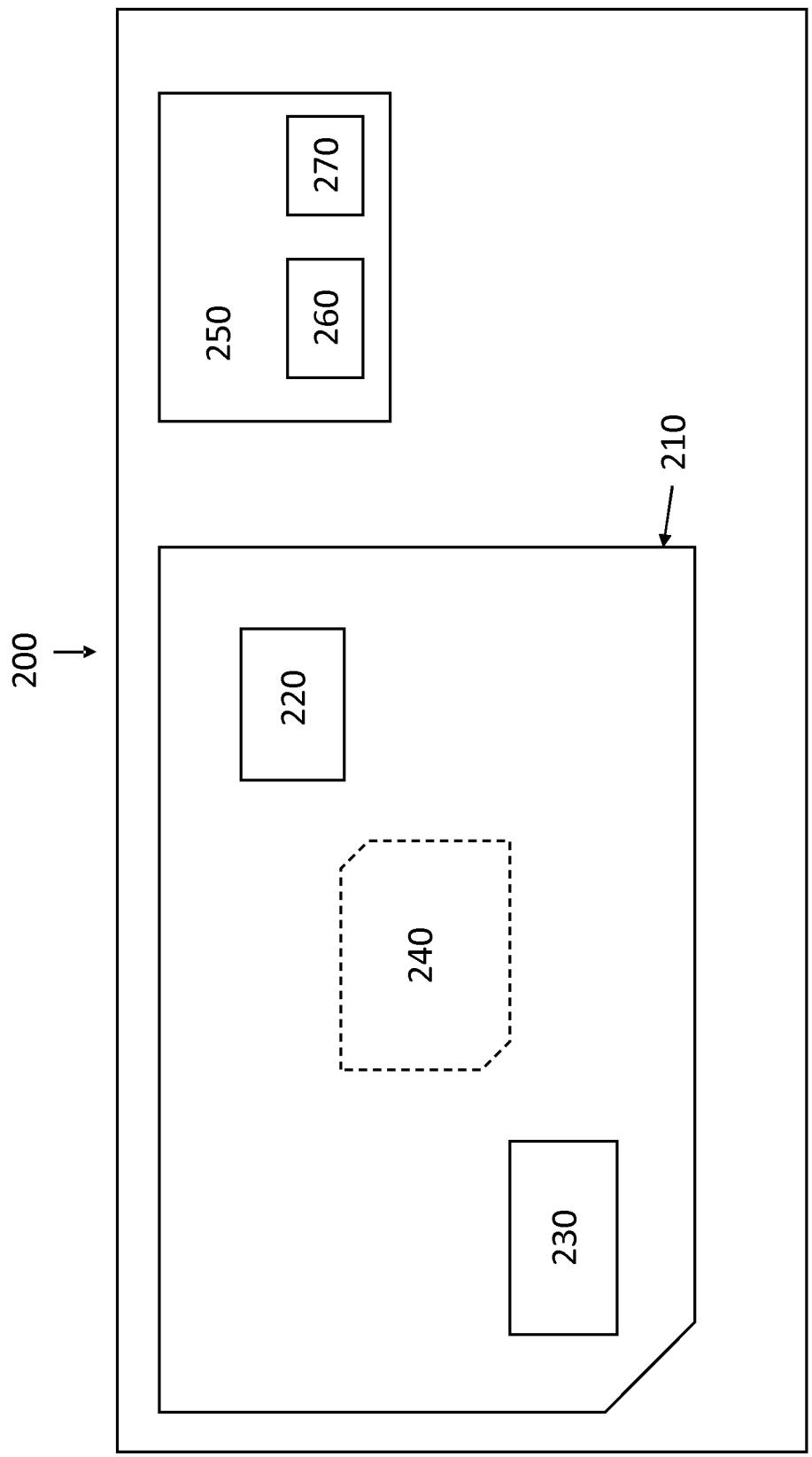
FIG. 2 illustrates an example embodiment of a see-through display element.

FIG. 2 illustrates an example embodiment of a see-through display element 200 that may be used for displaying augmented reality content in the apparatus 100. The see-through display element 200 comprises one or more waveguides for transmitting angular image information in the form of one or more light beams to the user's eye thereby enabling the user to perceive one or more images. As the one or more waveguides are at least partially transparent, the user is able to see the ambient physical environment through the one or more waveguides in addition to the one or more images.

The image information is in-coupled into a waveguide on one part of the waveguide and out-coupled on another part of the waveguide. The image information propagates along the inside of the waveguide as one or more of angularly related light beams that are internally reflected along the waveguides. Diffractive optics such as gratings or refractive optics such as prisms may be used to in-couple image information to the waveguide thereby forming an entrance pupil. The one or more angularly related light beams that are internally reflected within the waveguides may be out-coupled by matching diffractive or refractive optics as was used to in-couple the image information thereby forming an exit pupil that may be aligned with the user's eye.

In the example embodiment illustrated in FIG. 2, diffractive gratings are used to in-couple and out-couple the image information to and from the waveguide 210. A diffractive in-coupling grating 220 is used to in-couple the image information into the waveguide 210. A diffractive out-coupling grating 230 is used to expand the exit pupil in a first dimension and out-couple the image information from the waveguide 210. In addition, a diffractive intermediate grating 240 may optionally be used.

The diffractive intermediate grating 240 may be used to expand the exit pupil in a second dimension, for example in a vertical or horizontal direction. In some example embodiments, the second dimension is perpendicular to the first expansion dimension of the diffractive out-coupling-grating 230.

If the intermediate diffractive grating 240 is not present, the waveguide 210 comprises a one-dimensional expander. If the diffractive intermediate grating 240 is present, the waveguide 210 comprises a two-dimensional expander.

In the one-dimensional expander, a light beam that is in-coupled into the waveguide 210 maintains the angular relationship of the in-coupled light beam along the direction of propagation but without expanding the exit pupil in the orthogonal direction. A two-dimensional expander allows use of optics which can be smaller than those used with one-dimensional expanders because the light beams in the one-dimensional expanders need to be larger than the light beams that are used with the two dimensional expanders. Therefore the optics usable with two-dimensional expanders, that expand the light beams in two dimensions, may be lighter and fit better into form factors suitable for near-eye displays than optics usable with one-dimensional expanders.

The waveguide 210 of the example embodiment illustrated in FIG. 2 may be made of an optically transparent plane-parallel substrate. The diffractive input grating 220, the diffractive output grating 230 and the diffractive intermediate grating 240 can be replicated on the plane-parallel substrate using glass or alternatively a polymeric material of similar refractive index to the substrate or created as part of the substrate itself. The refractive index could be, for example, similar to standard glass, 1.5 or higher, like 1.7 for example. The diffractive input grating 220, the diffractive output grating 230 and the diffractive intermediate grating 240 can be patterned using microlithographic, holographic, stamping or any other suitable methods. Alternatively or additionally, any of stacked waveguides, one- or two-dimensionally curved waveguides and grating pitches tailored to desired wavelengths may be used. The diffractive input grating 220, the diffractive output grating 230 and the diffractive intermediate grating 240 may comprise any suitable periodic grating structure. The diffraction characteristics, such as grating angles, period and depths, of the diffractive input grating 220, the diffractive output grating 230 and the diffractive intermediate grating 240 control the way a light beam is projected by the waveguide 210.

In some example embodiments the waveguide 210 may be planar. In some other example embodiments, the waveguide 210 may be curved or spherical.

In some example embodiments, the apparatus 100 may comprise two waveguides, such as the waveguide 210. In such an example embodiment, the waveguides may be arranged such that when a user is wearing the apparatus 100 one of the waveguides is proximate to one eye of the user and the other waveguide is proximate to the other eye of the user.

The see-through display element 200 further comprises an optical engine 250. The optical engine 250 represents a pixel of the image information as rays of light that enters the diffractive in-coupling grating 220 at a certain angle. The optical engine 250 comprises a light source 260 and optics 270. The light source 260 may comprise any suitable light source. The light source 260 may be for example emissive, reflective or transmissive. In some example embodiments the light source 260 may be a micro-display such a Liquid Crystal On Silicon, LCOS, device, a MicroElectro Mechanical System, MEMS, device or any other suitable micro-display device operating in transmission, reflection or emission. In some example embodiments, the micro-display may not comprise a light source and thus requires external illumination to convey image information displayed on the display such as the see-through display element 200.

The light output by the light source 260 is refracted by the optics 270 before being output from the optical engine 250. The optics 270 may be designed to collimate the light from the light source 260 such that the rays of light emanating from a particular pixel of the light source 260 exit the optics 270 as a parallel light beam at a particular angle to the diffractive in-coupling grating 220. This way different pixels of the light source 260 are associated with light rays at different incident angels at the diffractive input grating 220. This may then produce different exit angles for light rays associated with pixels at the diffractive out-coupling grating 230.

In some example embodiments, there are two optical engines, such as the optical engine 250, one for the left side of the apparatus 100 and one for the right side of the apparatus 100. In such example embodiments, there may also be two waveguides such as the waveguide 210, one on the right side of the apparatus 100 and one on the left side of the apparatus 100. The optical engine for the left side of the apparatus 100 is configured to provide image information in the form of one or more light beams to the waveguide on the left side of the apparatus 100. The optical engine for the right side of the apparatus 100 is configured to provide image information in form of one or more light beams to the waveguide on the right side of the apparatus 100.

In some example embodiments there is one optical engine such as the optical engine 250. The optical engine may be provided in the center of the apparatus 100. The image information is then provided from the optical engine to the one or more waveguides, such as the waveguide 210, of the apparatus 100.

The image information is to be overlaid to the field of view of the user in such a manner that the virtual images are perceived as a natural part of the environment in the user's field of view. If the image information that the user perceives as one or more images is not overlaid in such a manner, then user's field of view may be perceived as disturbing and not enjoyable, or not perceived as a mixed reality entity. Therefore, it is desirable to enable a realistic way of inserting the image information by the apparatus 100 into the user's field of view.

The apparatus 100 may further comprise a camera. The camera enables tracking of the environment surrounding the apparatus 100 by providing information regarding the environment to the apparatus 100 such that computer vision may be utilized to extract information regarding the environment. This enables the apparatus 100 to align the one or more virtual images with the physical environment such that the one or more virtual images can be perceived by the user in a desired location of the physical environment.

In order to enable realistic integration of the virtual images to the physical environment, the apparatus 100 may comprise computer program code, which, when executed by the processor circuitry of the apparatus 100, may derive coordinates from the physical environment. These coordinates form the physical environment coordinate system and are independent from the camera, but they need to be derived from images produced by the camera. This process is also known as image registration.

The image registration may utilize different methods of computer vision. These methods may comprise two phases. First, one or more points of interest are detected, by the computer program code, from the images produced by the camera. Then, in the second phase, the physical environment coordinate system is restored based on the one or more points of interest detected in the first phase. The physical environment coordinate system is then used when producing the image information that is to be overlaid to the physical environment such that they can be perceived by the user as natural parts of the physical environment.

Various methods may be used to detect the one or more points of interest. Some methods utilize one or more markers, which are visual objects placed in the field of view of the camera and which appear in the image produced by the camera, for use as the point of interest.

The one or more markers are such that they are physical objects that are placed in the physical environment before the apparatus 100 is used. Because the markers are placed in the physical environment beforehand, the use of the one or more markers may limit the interactivity enabled by the augmented reality.

Alternatively, the object tracking, in which one or more points of interest are detected without the one or more markers, may also be performed in augmented reality systems. In such methods features, such as fingers, head, picture, eyes and/or any other known features are detected from the image produced by the camera. In order to detect the features, methods such as corner detection, blob detection, edge detection or thresholding and/or other image processing methods may be used.

Figure 3:
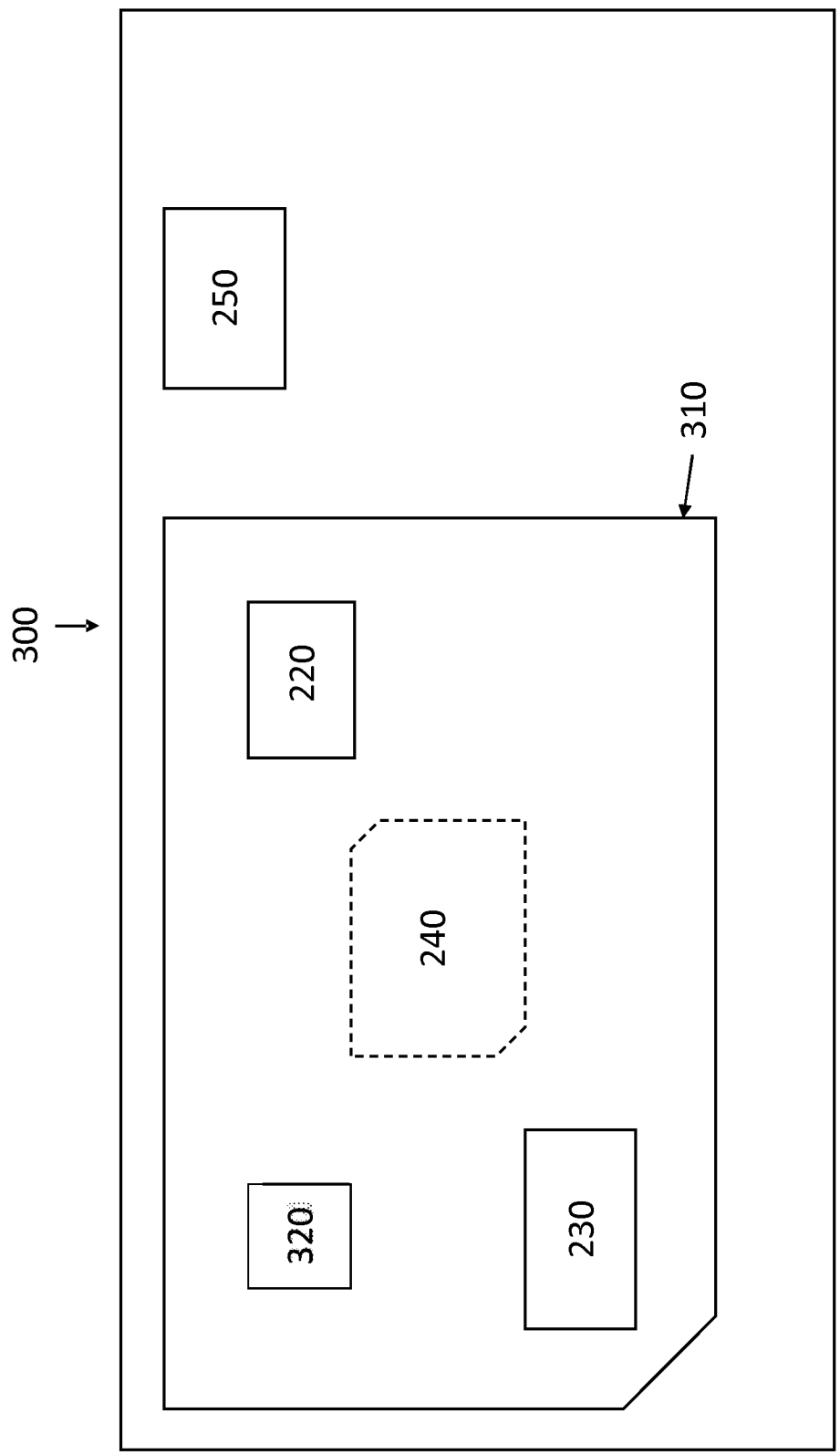
FIG. 3 illustrates an example embodiment of another see-through display element.

FIG. 3 illustrates a see-through display element 300. The see-through display element 300 may be comprised in the apparatus 100. In this example embodiment, the apparatus 100 comprises a camera. The camera is located in the front side of the apparatus 100 and proximate to an eye of the user when the apparatus is worn by a user. The see-through display element 300 comprises an optical engine 250 like that of the see-through display element 200 illustrated in FIG. 2. The see-through display element 300 further comprises a waveguide 310. The waveguide 310 may be made like the waveguide 210 introduced in FIG. 2. In some example embodiments the waveguide 310 may be planar. In some other example embodiments, the waveguide 310 may be curved or spherical.

The waveguide 310 comprises a diffractive in-coupling grating 220, a diffractive out-coupling grating 230, which in this example embodiment is the first diffractive out-coupling grating and, optionally, a diffractive intermediate grating 240 like that of the waveguide 210 illustrated in FIG. 2. In addition, the waveguide comprises a second diffractive out-coupling grating 320. The second diffractive out-coupling grating 320 is configured to out-couple image information to the camera.

As the image information is out-coupled to the camera, the camera is enabled to capture the image information overlaid in the physical environment, in addition to capturing the physical environment. This configuration enables the camera to provide images that correspond to the perception of the user. As the camera provides images that correspond to the perception of a user, the computer program code, executed by the processor circuitry, may automatically adjust the way the image information is overlaid to the physical environment if the alignment is not perceivable as realistic due to offset for example. This way the camera-display calibration may be adjusted automatically if needed and even during the use of the apparatus. The second diffractive out-coupling grating 320 thereby enables camera-display calibration that may be dynamically adjusted and which does not require additional environmental cues such as physical markers.

FIG. 4 illustrates the see-through display element 300 and the placement of a camera 410 such that the second diffractive out-coupling grating 320 is configured to out-couple one or more light beams 420 to the camera 410. The placement of the camera 410 and the second diffractive out-coupling grating 320 may vary. However, the closer the camera 410 is to the second diffractive out-coupling grating 320, the greater the correspondence between the perception of a user and the image provided by the camera 410.

It is to be noted that the apparatus 100 may comprise a see-through display element, such as the see-through display element 300 for the left side of the apparatus and another see-through display element, such as the see-through display element 300 for the right side of the apparatus. In such a configuration, the apparatus comprises two cameras, such as the camera 410, one for the left side and one for the right side of the apparatus. The apparatus 100 may be configured to use algorithms for image processing, which may form part of the computer program code executed by the processor circuitry. These algorithms may be used to compare images provided by the two cameras and thereby align the images if needed to ensure a realistic perception of the environment and the overlaid image information. Further, these algorithms may be used by the two cameras to perform automatic left-right display alignment.

It is also possible that one side of the apparatus 100, comprises a see-through display element, such as the see-through display element 300, and a camera, such as the camera 410, and the other side of the apparatus comprises a see-through display element such as the see-though display element 200 but does not comprise a camera.

Figure 5A:
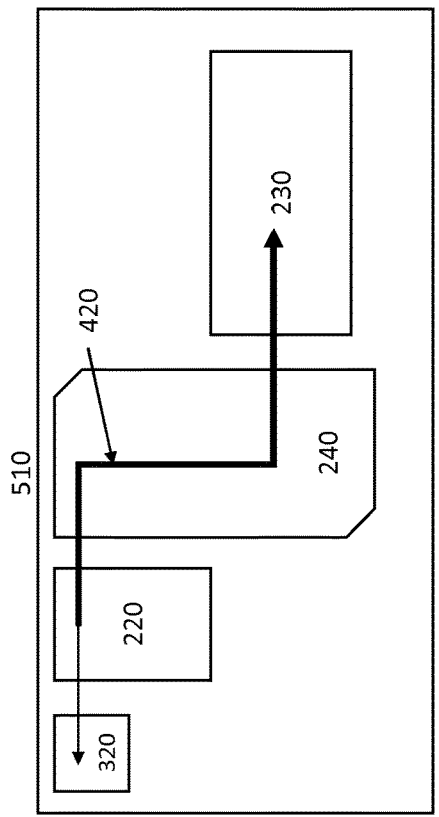
FIGS. 5a-5c illustrate example embodiments of waveguides.
Figure 5B:
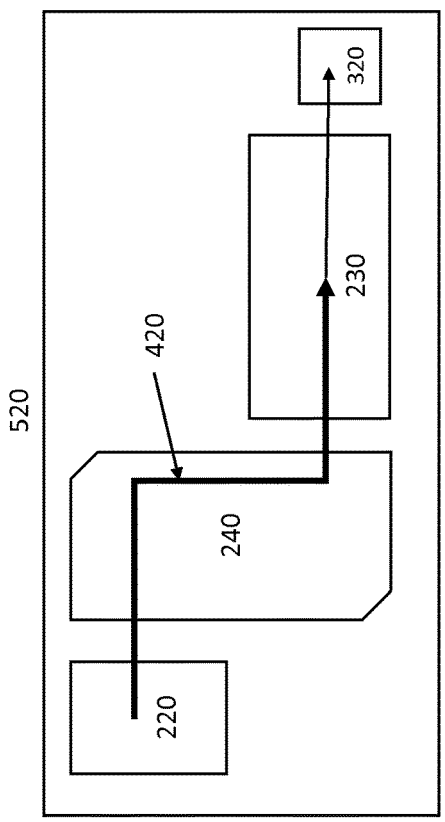
Figure 5C:
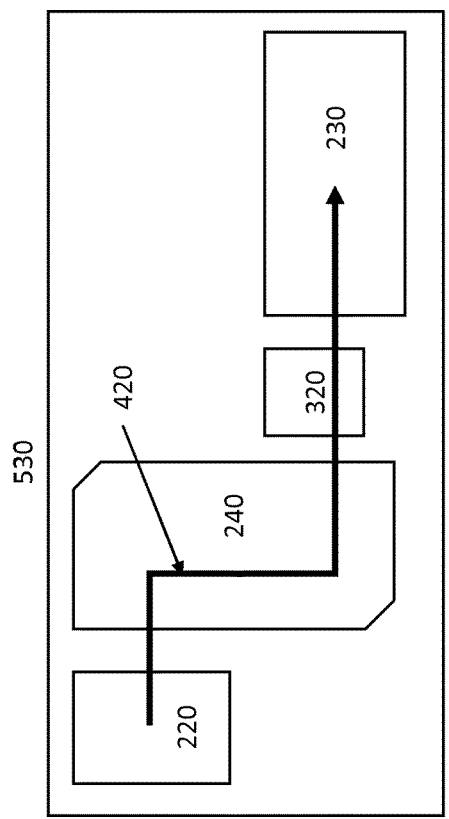

FIGS. 5a to 5c illustrate example embodiments of waveguides that comprise diffractive gratings for in-coupling, intermediate routing and out-coupling of one or more light beams. The waveguides may be made like the waveguide 210 introduced in FIG. 2. In some example embodiments the waveguides may be planar. In some other example embodiments, the waveguides may be curved or spherical.

FIG. 5a illustrates an example embodiment of a waveguide 510. The waveguide 510 is suitable for use in the apparatus 100. In this example embodiment, the apparatus 100 comprises the camera 410 and the optical engine 250. The waveguide 510 comprises the diffractive in-coupling grating 220, the first diffractive out-coupling grating 230 and the diffractive intermediate grating 240. The first diffractive out-coupling grating 230 is configured to out-couple the one or more light beams 420 to the eye of the user. The waveguide 510 further comprises the second diffractive out-coupling grating 320 that is configured to out-couple the one or more light-beams 420 to the camera 410.

In this example embodiment, the placement of the second diffractive out-coupling grating 320 is such that it is next to the diffractive in-coupling grating 220 and on an edge of the waveguide 510.

FIG. 5b illustrates an example embodiment of a waveguide 520. The waveguide 520 is suitable for use in the apparatus 100. In this example embodiment, the apparatus 100 comprises the camera 410 and the optical engine 250. The waveguide 520 comprises the diffractive in-coupling grating 220, the first diffractive out-coupling grating 230 and the diffractive intermediate grating 240. The first diffractive out-coupling grating 230 is configured to out-couple the one or more light beams 420 to the eye of the user. The waveguide 510 further comprises the second diffractive out-coupling grating 320 that is configured to out-couple the one or more light-beams 420 to the camera 410.

In this example embodiment, the placement of the second diffractive out-coupling grating 320 is such that it is next to the first diffractive out-coupling grating 230 and on an edge of the waveguide 520.

FIG. 5c illustrates an example embodiment of a waveguide 530. The waveguide 530 is suitable for use in the apparatus 100. In this example embodiment, the apparatus 100 comprises the camera 410 and the optical engine 250. The waveguide 530 comprises the diffractive in-coupling grating 220, the first diffractive out-coupling grating 230 and the diffractive intermediate grating 240. The first diffractive out-coupling grating 230 is configured to out-couple the one or more light beams 420 to the eye of the user. The waveguide 530 further comprises the second diffractive out-coupling grating 320 that is configured to out-couple the one or more light-beams 420 to the camera 410.

In this example embodiment, the placement of the second diffractive out-coupling grating 320 is such that it is between the diffractive intermediate grating 240 and the first diffractive out-coupling grating 230 on the waveguide 510.

Figure 6B:
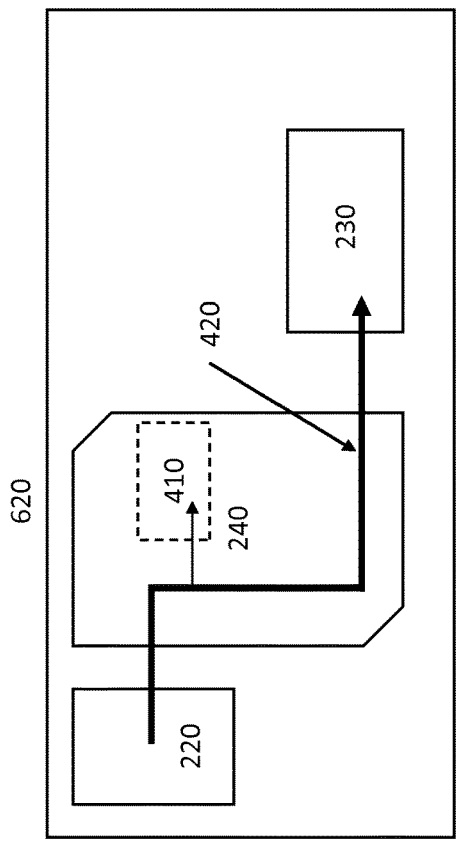
FIGS. 6a-6b illustrate further example embodiments of waveguides
Figure 6A:
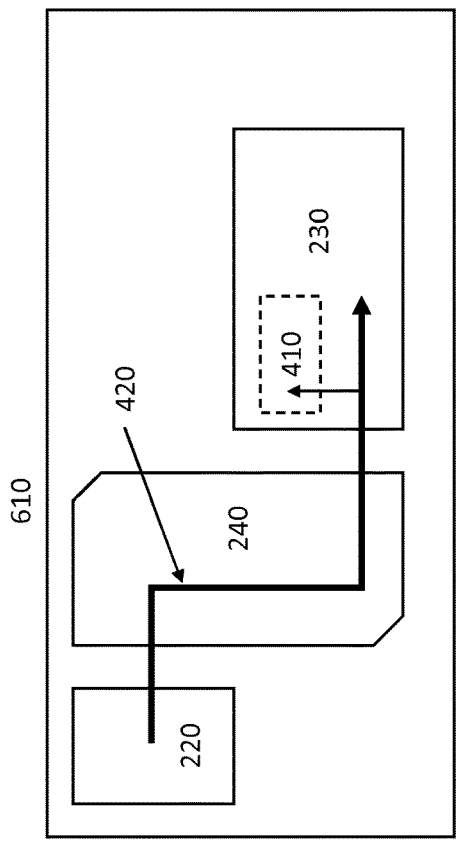

FIGS. 6a to 6b illustrate example embodiments of waveguides that comprise diffractive gratings for in-coupling, intermediate routing and out-coupling of one or more light beams. The waveguides may be made like the waveguide 210 introduced in FIG. 2. In some example embodiments the waveguides may be planar. In some other example embodiments, the waveguides may be curved or spherical.

FIG. 6a illustrates an example embodiment of a waveguide 610. The waveguide 610 is suitable for use in the apparatus 100. In this example embodiment, the apparatus 100 comprises the camera 410 and the optical engine 250. The waveguide 610 comprises the diffractive in-coupling grating 220, the first diffractive out-coupling grating 230 and the diffractive intermediate grating 240. The first diffractive out-coupling grating 230 is configured to out-couple the one or more light beams 420 to the eye of the user. The waveguide 610 however does not comprise a second diffractive out-coupling grating that would be configured to out-couple the one or more light-beams 420 to the camera 410. Instead, in this example embodiment, the first diffractive out-coupling grating 230 is configured to function as the second diffractive out-coupling as well and to out-couple the one or more light beams 420 to the camera 410 as well as to the eye of the user.

FIG. 6b illustrates an example embodiment of a waveguide 620. The waveguide 620 is suitable for use in the apparatus 100. In this example embodiment, the apparatus 100 comprises the camera 410 and the optical engine 250. The waveguide 620 comprises the diffractive in-coupling grating 220, the first diffractive out-coupling grating 230 and the diffractive intermediate grating 240. The first diffractive out-coupling grating 230 is configured to out-couple the one or more light beams 420 to the eye of the user. The waveguide 620 however does not comprise a second diffractive out-coupling grating that would be configured to out-couple the one or more light-beams 420 to the camera 410. Instead, in this example embodiment, the diffractive intermediate grating 240 is configured to function as the second diffractive out-coupling as well and to out-couple the one or more light beams 420 to the camera 410. This example embodiment is possible in such a case that the diffractive intermediate grating 240 that expands the one or more light beams 420 also leaks part of the one or more light beams 420 out of the waveguide 620 which enables the camera to capture the image information provided by the one or more light beams 420.

Figure 7:
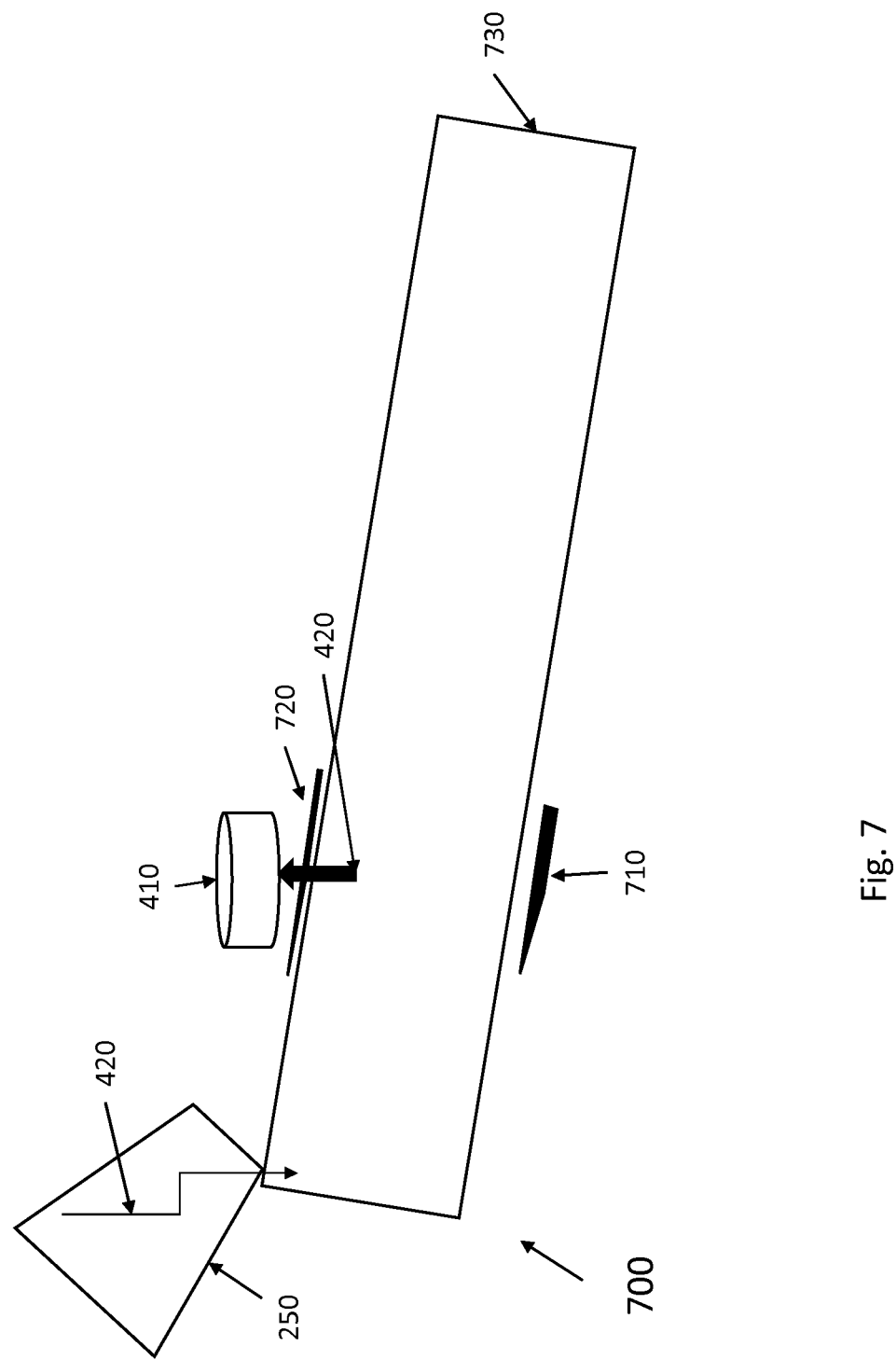
FIG. 7 illustrates a further example embodiment of a see-through display element.

FIG. 7 illustrates an example embodiment of a see-through display element 700 that is suitable for use in the apparatus 100. The see-through display element 700 comprises the optical engine 250, the waveguide 730, which may be any of the waveguides 310, 510, 520, 530, 610, 620, or any other waveguide that comprises a diffractive in-coupling element for in-coupling the one or more light beams 420 provided by the optical engine 250 and at least one diffractive out-coupling element that out-couples the one or more light beams 420 towards the camera 410 and one or more eyes of a user. The waveguide 730 may optionally comprise a diffractive intermediate grating, such as the diffractive intermediate grating 240. The waveguide 730 may optionally comprise two different diffractive out-coupling gratings such as the first diffractive out-coupling grating 230 and the second diffractive out-coupling grating 320.

The display element 700 further comprises a shutter 710. The shutter 710 may be used when the ambient light from the physical environment is to be at least partially filtered such that objects are at least partially obscured and thereby are not viewable through the waveguide 730. The shutter 710 may comprise a light filtration array. The light filtration array may be an electrochromic light filtration array, a liquid crystal filtration array, a shutter light filtration array and/or the like. In some circumstances, the light filtration array may comprise a plurality of light filtration elements, light filtration cells and/or the like such that the light filtration array may be selectively actuated to filter more ambient light at a particular position on the light filtration array, to filter less ambient light at a different position on the light filtration array and/or the like.

The shutter 710 may be placed such that it is in front of the camera thereby enabling blocking the camera from seeing the physical environment. The shutter 710 may be configured to operate such that it is synchronized with formation of the image information produced by the optical engine 250 and capturing of images by the camera 410 such that the camera 410 is configured to select what is captured. When the shutter 710 is configured to pass light and the optical engine 250 is configured not to produce image information, the camera 410 captures an image of the physical environment only. When the shutter 710 is configured to block light and the optical engine 250 is configured to produce image information, the camera 410 captures an image provided by the light beams 420 only.

The display element 700 may further comprise a movable polarizer 720 that is located between the waveguide 730 and the camera 410. The movable polarizer 720 is a polarizer that may, automatically, by utilizing computer program code, or manually, be adjusted to be oriented at a desired angle with respect to a line-of-sight aligned with the camera 410.

It may be desirable in some circumstances to prevent the camera 410 from seeing the image information provided by the one or more light beams 420. As the light beams 420 may consist of polarized light, the movable polarizer 720 may be adjusted to an angle that prevents the camera from detecting the light beams 420 and thereby preventing the camera from detecting image information from optical engine 250 but still capture an image of the ambient environment.

In some example embodiments, the display element 700 may comprise the movable polarizer 720 and not the shutter 710. In such example embodiment, the camera 410 may detect the physical environment, but not the one or more virtual images. In some other example embodiments, the display element 700 may comprise the shutter 710 but not the movable polarizer 720.

Figure 8:
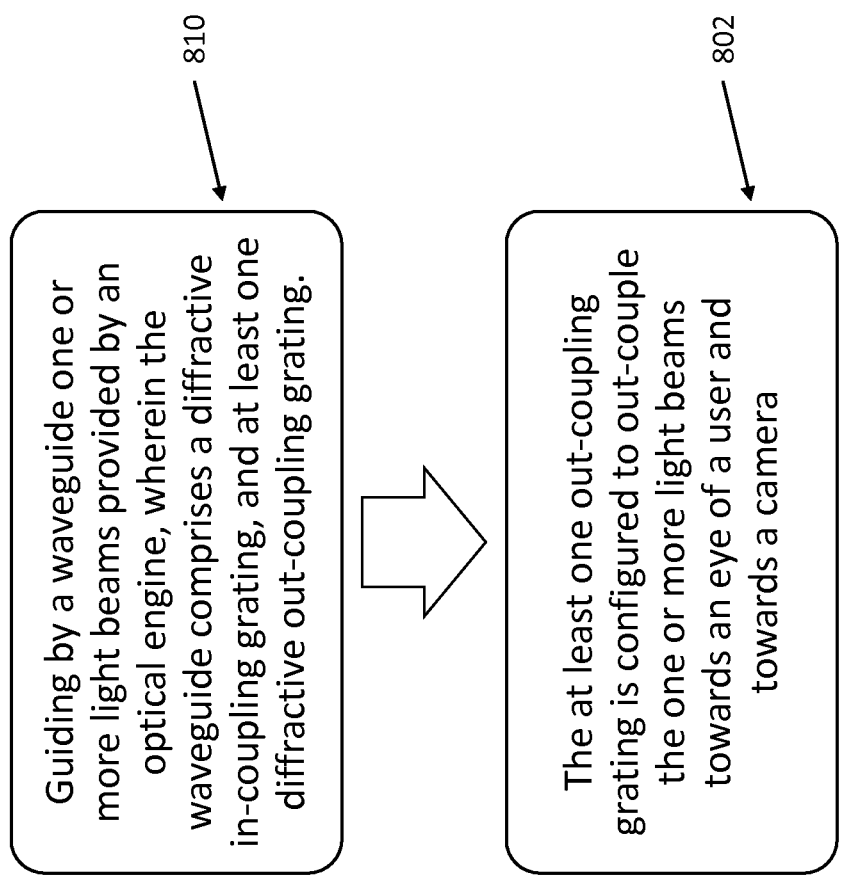
FIG. 8 is a flow chart of an example embodiment

FIG. 8 illustrates a flow chart according to an example embodiment of the invention. In step 810 one or more light beams provided by an optical engine are guided by a waveguide. The waveguide comprises a diffractive in-coupling grating and at least one diffractive out-coupling grating.

In step 820 the at least one out-coupling grating is configured to out-couple the one or more light beams towards an eye of a user and towards a camera.

Although various aspects of the invention are set out in the independent claims, other aspects of the invention comprise other combinations of features from the described example embodiments and/or the dependent claims with the features of the independent claims, and not solely the combinations explicitly set out in the claims.

It is also noted herein that while the foregoing describes example embodiments of the invention, these descriptions should not be viewed in a limiting sense. Rather, there are several variations and modifications which may be made without departing from the scope of the present invention as defined in the appended claims

The invention claimed is:

1. An apparatus comprising:
an optical engine configured to provide one or more light beams;
a camera; and
a waveguide configured to guide the one or more light beams,
wherein the waveguide comprises a diffractive in-coupling grating, and at least one diffractive out-coupling grating, and
wherein the at least one diffractive out-coupling grating is configured to out-couple the one or more light beams simultaneously towards an eye of a user and towards the camera.

2. The apparatus according to claim 1 further comprising a diffractive intermediate grating.

3. The apparatus according to claim 2, wherein the at least one diffractive out-coupling grating comprises:
a first diffractive out-coupling grating configured to out-couple the one or more light beams towards the eye of the user, and
the diffractive intermediate grating is configured to out-couple the one or more light beams towards the camera.

4. The apparatus according to claim 1, wherein the at least one diffractive out-coupling grating comprises:
a first diffractive out-coupling grating configured to out-couple the one or more light beams towards the eye of the user, and
a second diffractive out-coupling grating configured to out-couple the one or more light beams towards the camera.

5. The apparatus according to claim 1, the apparatus further comprising a shutter located in front of the camera.

6. The apparatus according to claim 4, further comprising a movable polarizer located between the second diffractive out-coupling grating and the camera.

7. The apparatus according to claim 1, wherein the camera is configured to detect the one or more out-coupled light beams and the environment.

8. The apparatus according to claim 6, wherein the out-coupled one or more light beams and the environment detected by the camera are used to adjust the one or more light beams provided by the optical engine.

9. The apparatus according to claim 1 further comprising a second waveguide, and a second camera.

10. The apparatus according to claim 8, wherein the apparatus further comprises a second optical engine and wherein the optical engine and the second optical engine are located on separate sides of the apparatus.

11. The apparatus according to claim 8, wherein the camera and the second camera are located on a left side and a right side of the apparatus, respectively, and wherein the apparatus is further configured to perform left-right display adjustment for the camera and the second camera.

12. The apparatus according to claim 1, wherein the optical engine is located on the side of the apparatus.

13. The apparatus according to claim 1, wherein the optical engine is located in the middle of the apparatus.

14. A method comprising:
guiding, by a waveguide, one or more light beams provided by an optical engine, wherein the waveguide comprises a diffractive in-coupling grating, and at least one diffractive out-coupling grating, and
wherein the at least one diffractive out-coupling grating is configured to out-couple the one or more light beams simultaneously towards an eye of a user and towards a camera.

15. A computer program product comprising a non-transitory computer-readable storage medium bearing computer program code embodied therein for use with a computing apparatus, the computer program code comprising instructions which, when executed by the computing apparatus, cause the computing apparatus to perform the method according to claim 14.

* * * * *